United States Patent
Hoffstadt (10) Patent No.: US 9,732,732 B2
(45) Date of Patent: Aug. 15, 2017

(54) SYSTEMS AND METHODS FOR CONVERTING WIND FROM AN AIRCRAFT INTO ELECTRICAL POWER

(71) Applicant: The Boeing Company, Seal Beach, CA (US)

(72) Inventor: Brett Mukherjee Hoffstadt, Media, PA (US)

(73) Assignee: The Boeing Company, Chicago, IL (US)

( * ) Notice: Subject to any disclaimer, the term of this patent is extended or adjusted under 35 U.S.C. 154(b) by 576 days.

(21) Appl. No.: 13/784,373

(22) Filed: Mar. 4, 2013

(65) Prior Publication Data
US 2014/0248147 A1    Sep. 4, 2014

(51) Int. Cl.
*F03D 9/00*    (2016.01)

(52) U.S. Cl.
CPC .......... *F03D 9/00* (2013.01); *F05B 2220/602* (2013.01); *F05B 2270/321* (2013.01); *Y02E 10/72* (2013.01)

(58) Field of Classification Search
CPC .... F03D 1/0608; F03D 1/0666; F03D 7/0224; F05B 2240/221; F05B 2240/2211; F05B 2240/33; F05B 2260/70; F05B 2270/101; F05B 2220/602; F05B 2270/321; F04D 27/002; F04D 27/0246; F04D 29/263
See application file for complete search history.

(56) References Cited

U.S. PATENT DOCUMENTS

| | | | | |
|---|---|---|---|---|
| 4,290,470 A | * | 9/1981 | Williams | B60C 11/032 152/209.4 |
| 4,616,974 A | * | 10/1986 | Andruszkiw | F03D 1/04 415/4.3 |
| 5,998,882 A | * | 12/1999 | Alston | 290/54 |
| 7,380,751 B1 | * | 6/2008 | Henson | 244/114 B |
| 7,793,886 B2 | | 9/2010 | Henson, III | |
| 2008/0258469 A1 | * | 10/2008 | Stephens | F03D 3/002 290/55 |
| 2009/0146432 A1 | * | 6/2009 | Ballena | F03D 3/0445 290/55 |
| 2009/0250936 A1 | * | 10/2009 | Souryal | F03D 9/00 290/55 |
| 2010/0176599 A1 | | 7/2010 | Henson, III | |
| 2010/0260593 A1 | * | 10/2010 | Cumings | F03D 3/0472 415/1 |

(Continued)

FOREIGN PATENT DOCUMENTS

| | | | | |
|---|---|---|---|---|
| EP | 2339175 A2 | | 6/2011 | |
| WO | WO90/13104 | * | 11/1990 | G08G 5/06 |

OTHER PUBLICATIONS

International Search Report and Written Opinion of International Application No. PCT/US2014/012501; Apr. 23, 2014; 12 pages.

(Continued)

*Primary Examiner* — Bryan Lettman
*Assistant Examiner* — Timothy Solak
(74) *Attorney, Agent, or Firm* — Armstrong Teasdale LLP (57) ABSTRACT

A system for generating energy from wind induced by an aircraft is provided. The system includes one or more wind turbines configured to generate electrical power by capturing wind induced by the aircraft. Each of the one or more wind turbines include a rotor mounted for rotation about an axis, and a plurality of blades coupled to the rotor.

19 Claims, 6 Drawing Sheets

(56) References Cited

U.S. PATENT DOCUMENTS

2010/0276940 A1* 11/2010 Khavari .................. F03D 3/005
                                                        290/55
2011/0008164 A1   1/2011 Presz, Jr.
2011/0187114 A1*  8/2011 Socolove ........................ 290/55
2012/0051907 A1*  3/2012 Rogers .................. F03D 7/0224
                                                        416/1

OTHER PUBLICATIONS

International Preliminary Report on Patentability received for related matter PCT/US2014/012501 dated Sep. 8, 2015; 8 pp.

* cited by examiner

SYSTEMS AND METHODS FOR CONVERTING WIND FROM AN AIRCRAFT INTO ELECTRICAL POWER

BACKGROUND OF THE INVENTION

The subject matter described herein relates generally to wind turbines and, more particularly, to systems and methods for converting wind from an aircraft into electrical power.

It is well known to use wind turbines to generate energy from the wind. Typically, high speed propeller-type turbines have been used due to their high efficiency. Such high-speed turbines are generally very large and generally comprise a nacelle mounted for use atop single towers of significant height and diameter. Such turbines may be unidirectional and erected to take advantage of the usual flow of winds through the location in which they are positioned. Typically, these wind turbines are deployed in open fields or mesas, as far from wind-slowing obstructions as possible to allow wind to strike their airfoils or blades at optimum speed. In addition, they are raised above the ground as much as possible to bring the airfoils away from wind-slowing ground effects.

However, there is a need in the field of wind power generation for relatively compact wind turbine units which can be readily transported and mounted at airports and are capable of capturing wind induced by aircrafts.

BRIEF DESCRIPTION OF THE INVENTION

In one aspect, a system for generating energy from wind induced by an aircraft is provided. The system includes one or more wind turbines configured to generate electrical power by capturing wind induced by the aircraft. Each of the one or more wind turbines include a rotor mounted for rotation about an axis, and a plurality of blades coupled to the rotor.

In another aspect, a method for using a wind turbine to generate energy from wind induced by an aircraft is provided. The method includes, determining whether the aircraft is preparing to takeoff or preparing to land, and adjusting one or more parameters of the wind turbine based on the indication that the aircraft is preparing to takeoff or preparing to land, wherein the wind turbine comprises a rotor mounted for rotation about an axis, and a plurality of blades coupled to the rotor.

In yet another aspect, a wind turbine for generating energy from wind induced by an aircraft is provided. The wind turbine includes a rotor mounted for rotation about an axis, a plurality of blades coupled to the rotor, and a processor. The processor is programmed to receive an indication that the aircraft is preparing to takeoff or preparing to land, and adjust one or more parameters of the wind turbine based on the indication that the aircraft is preparing to takeoff or preparing to land.

DETAILED DESCRIPTION OF THE INVENTION

Figure 1:
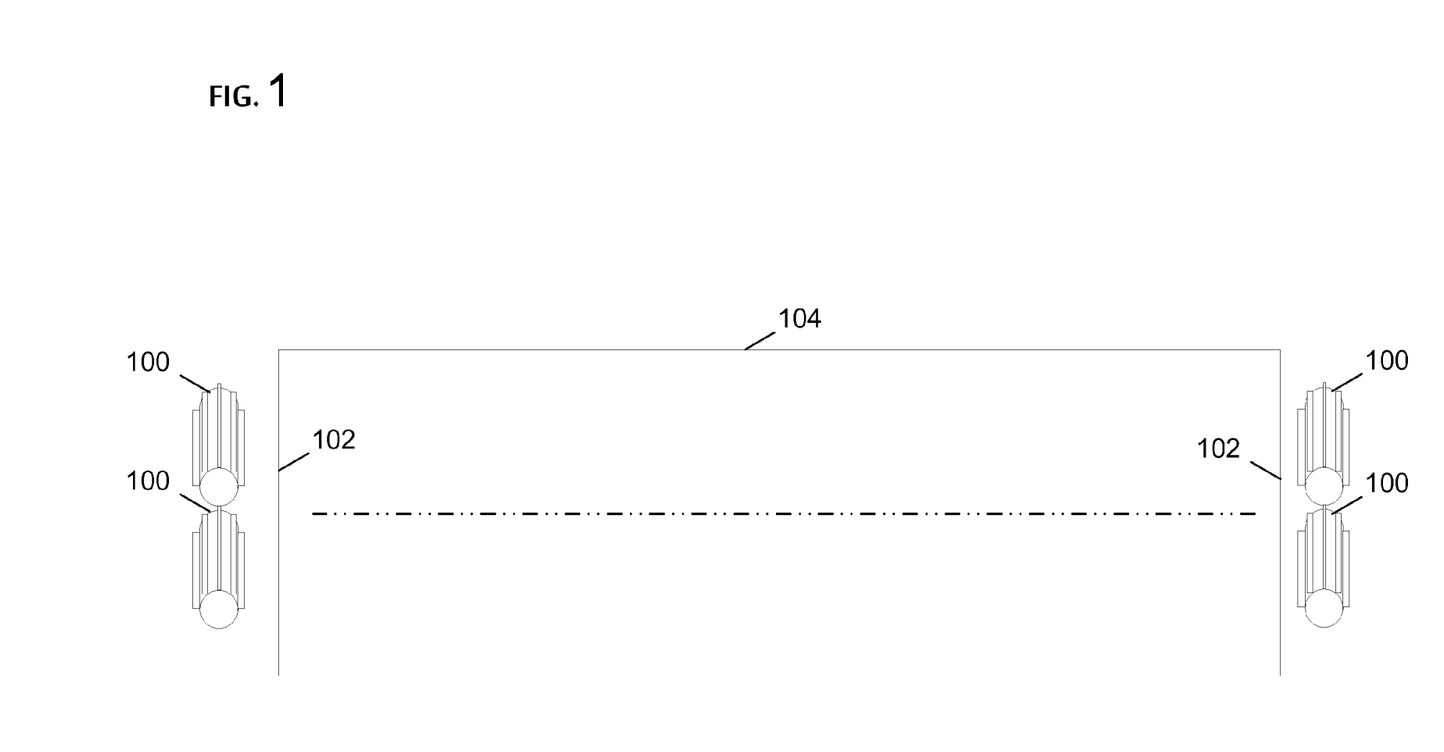
FIG. 1 is an illustrative example of wind turbines placed at either ends of an airport runway.

Air discharged from an aircraft engine at takeoff (e.g., jetwash) can produce "winds" that exceed 300 mph. The speed of discharged air/wind is greatest immediately behind the engines at takeoff. For example, at one end of a runway prior to takeoff, pilots usually accelerate their engines to full power with their wheel brakes engaged in order to achieve desired air speed at the other end of the runway in order to lift off. This engine accelerating position for takeoff is generally the same for all planes taking off. Immediately behind this accelerating position on the runway, air/wind is discharged at speeds exceeding 300 mph. This high velocity air/wind exerts tremendous force and contains much inherent power. Similarly, the velocity of air/wind forced down by an aircraft (e.g., downwash) during a landing also exerts tremendous force and inherent power. The force of the air/wind forced down by an aircraft during a landing is significant immediately ahead of the runway because the downwash from the aircraft has had very little altitude or time to disperse before impacting the ground. As such, to take advantage of the wind induced by these aircrafts, and with reference to FIG. 1, embodiments of the present disclosure provide wind turbines 100 located at or near an edge 102 of an airport runway 104. This enables wind turbines 100 to harness the wind generated by an aircraft upon takeoff and landing. However, while FIG. 1 illustrates a location of wind turbines 100 at ends 102 of runway 104, one of ordinary skill in the art guided by the teachings herein will appreciate that wind turbines 100 may be located at a variety of locations along or near runway 104 to facilitate capturing the air generated by an aircraft.

Figure 2:
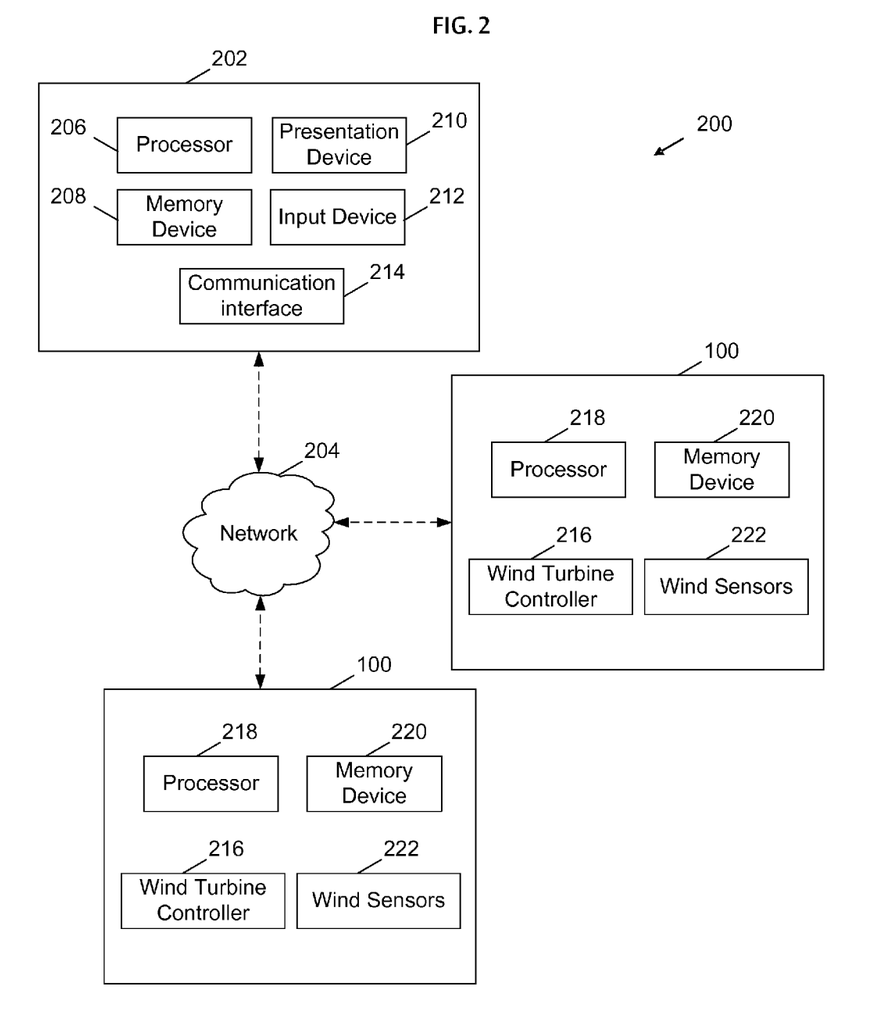
FIG. 2 is a block diagram illustrating an exemplary system for use in operating one or more wind turbines.

With reference now to FIG. 2, a block diagram illustrating an exemplary system 200 for use in operating wind turbines 100 is provided. System 100 includes a computing device 202, a network 204, and wind turbines 100 (e.g., as shown in FIG. 1) coupled to computing device 202 via network 204. Network 204 may include, without limitation, the Internet, a local area network (LAN), a wide area network (WAN), a wireless LAN (WLAN), a mesh network, and/or a virtual private network (VPN).

Computing device 202 includes a processor 206 for executing instructions, and a memory device 208. In some embodiments, executable instructions are stored in memory device 208. Memory device 208 is any device allowing information, such as executable instructions and/or other data, to be stored and retrieved. For example, memory device 208 may store computer readable instructions for determining and responding to power output levels, and/or for receiving and processing input (e.g., target power output levels, flight schedules, weather conditions, etc.). In addition, memory device 208 may be configured to store aircraft information such as wind speeds induced by an aircraft upon takeoff and upon landing, and/or any other data suitable for use with the methods described herein. In one embodiment, memory device 208 may be remote from computing device 202. In another embodiment, the data and the computer-executable instructions may be stored in a cloud service, a database, or other memory area accessible by computing device 202. Such embodiments reduce the computational and storage burden on computing device 202.

In some embodiments, computing device 202 includes at least one presentation device 210 for presenting information to a user. Presentation device 210 is any component capable of conveying information to a user. Presentation device 210 may include, without limitation, a display device (e.g., a liquid crystal display (LCD), organic light emitting diode (OLED) display, or "electronic ink" display) and/or an audio output device (e.g., a speaker or headphones). In some embodiments, presentation device 210 includes an output adapter, such as a video adapter and/or an audio adapter. An output adapter is operatively coupled to processor 206 and configured to be operatively coupled to an output device, such as a display device or an audio output device.

In some embodiments, computing device 202 includes an input device 212 for receiving input from a user. Input device 212 may include, for example, a keyboard, a pointing device, a mouse, a stylus, a touch sensitive panel (e.g., a touch pad or a touch screen), a position detector, and/or an audio input device. A single component, such as a touch screen, may function as both an output device of presentation device 210 and input device 212. Computing device 202 also includes a communication interface 214, which is configured to be communicatively coupled to one or more wind turbine controllers 216 and/or one or more other computing devices 202.

As shown in FIG. 2, each wind turbine 100 includes wind turbine controller 216. While wind turbine controller 216 is shown to be positioned with wind turbine 100, alternatively, wind turbine controller 216 may be positioned outside wind turbine 100. For example, wind turbine controller 216 may be communicatively coupled to wind turbine 100 via network 202.

In one embodiment, wind turbine controller 216 includes a processor 218. Processor 218 may include a processing unit, such as, without limitation, an integrated circuit (IC), an application specific integrated circuit (ASIC), a microcomputer, a programmable logic controller (PLC), and/or any other programmable circuit. Processor 218 may include multiple processing units (e.g., in a multi-core configuration). Wind turbine controller 216 is configurable to perform the operations/processes (e.g., process 600 described below) described herein by programming processor 218 with appropriate instructions. For example, processor 218 may be programmed by encoding an operation as one or more executable instructions and providing the executable instructions to processor 218 in memory device 220 that is coupled to processor 218. Memory device 220 may include, without limitation, one or more random access memory (RAM) devices, one or more storage devices, and/or one or more computer readable media. In one embodiment, memory device 220 may be remote from wind turbine controller 216. In another embodiment, the data and the computer-executable instructions may be stored in a cloud service, a database, or other memory area accessible by wind turbine controller 216. Such embodiments reduce the computational and storage burden on wind turbine controller 216.

Wind turbine 100 may also include one or more wind sensors 222 that are coupled in communication with wind turbine controller 216. Wind sensors 222 are configured to provide a predicted or actual wind speed as well as a direction of the wind with respect to wind turbine 100. Wind sensors 222 may provide wind data in real time, periodically (e.g., every minute, every five minutes, or every hour), or upon request.

Figure 3:
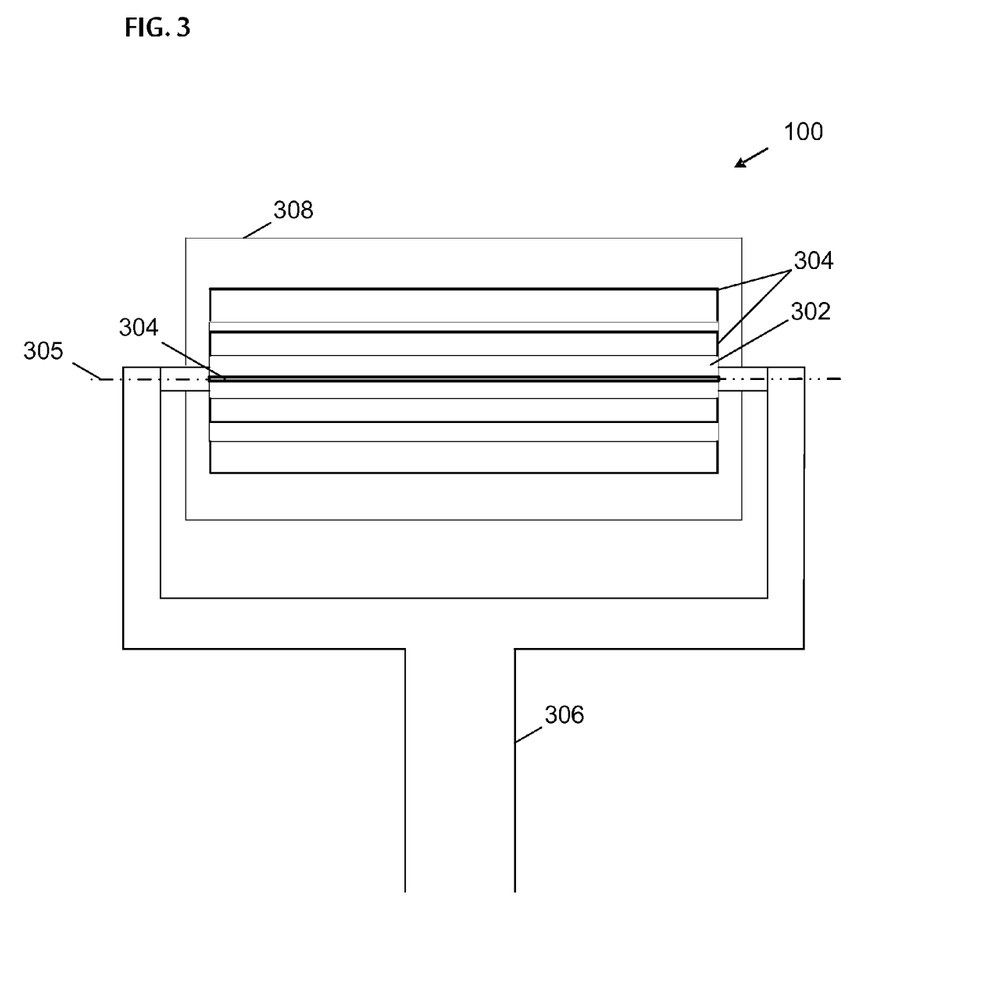
FIGS. 3-5 are perspective views of an exemplary wind turbine.

With reference now to FIG. 3, a perspective view of wind turbine 100 in accordance with one embodiment or the present disclosure is provided. As shown in FIG. 3, wind turbine 100 has a cylindrical structure, which includes a horizontal shaft or rotor 302 having a plurality of blades 304 coupled thereto. Blades 304 are coupled to rotor 302 in rows along a length of rotor 302 extending along axis 305, and are spaced about a circumference of rotor 302. One of ordinary skill in the art guided by the teachings herein will appreciate that rotor 302 may have any suitable number of blades 304 that enables wind turbine 100 to function as described herein. Further, rotor blades 304 may have any suitable length that enables wind turbine 100 to function as described herein.

In one embodiment, a support structure 306 maintains or a position of wind turbine 100 and maintains a direction wind turbine faces. However, support structure 306 may also be used to alter a height of wind turbine 100 and alter a direction wind turbine 100 faces. For example, a height of support structure 306 may be adjusted such that wind turbine 100 is raised or lowered as needed. In addition, support structure 306 is rotatable. As such, support structure can rotate/turn up to 360 degrees in either a clock wise or counter clock wise direction, which in turn rotates/turns wind turbine 100. Therefore, based on a direction an aircraft is either taking or landing from, support structure 306 enables a direction wind turbine 100 faces and/or a height of wind turbine 100 to be adjusted to maximize or minimize an amount of wind captured by wind turbine 100.

Figure 4:
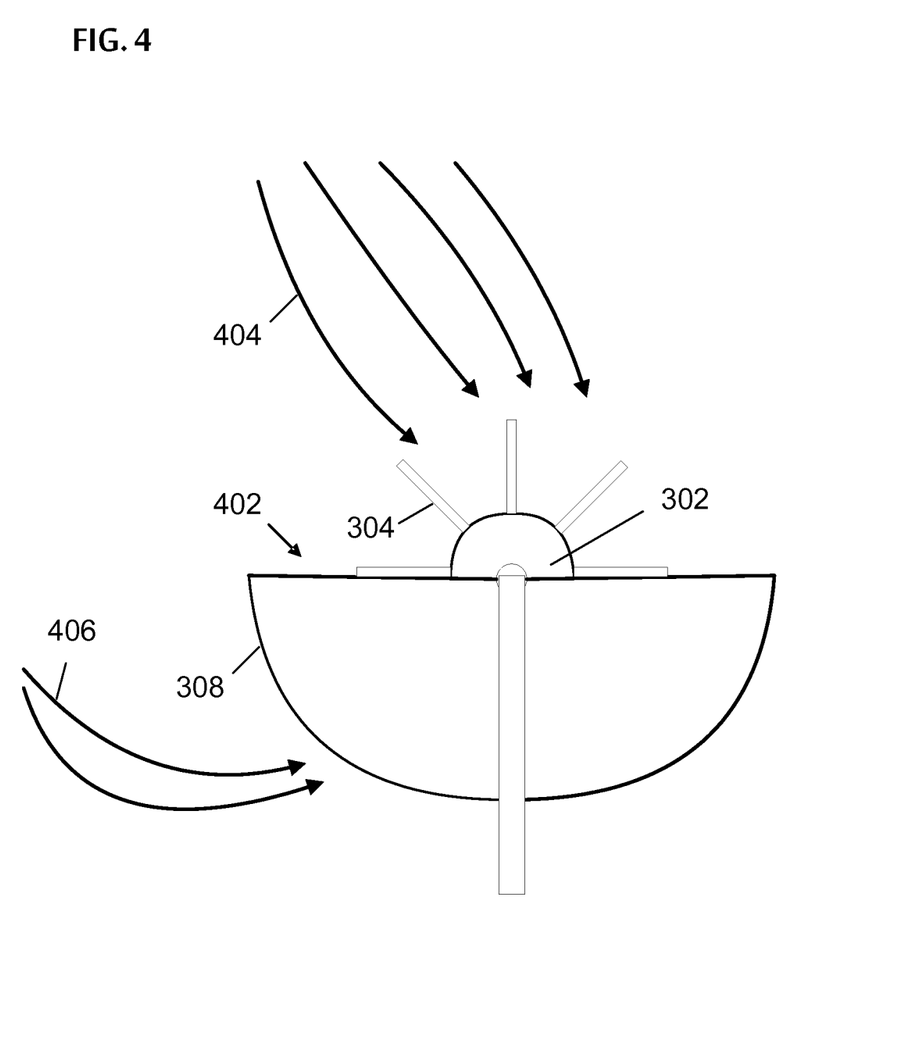
Figure 5:
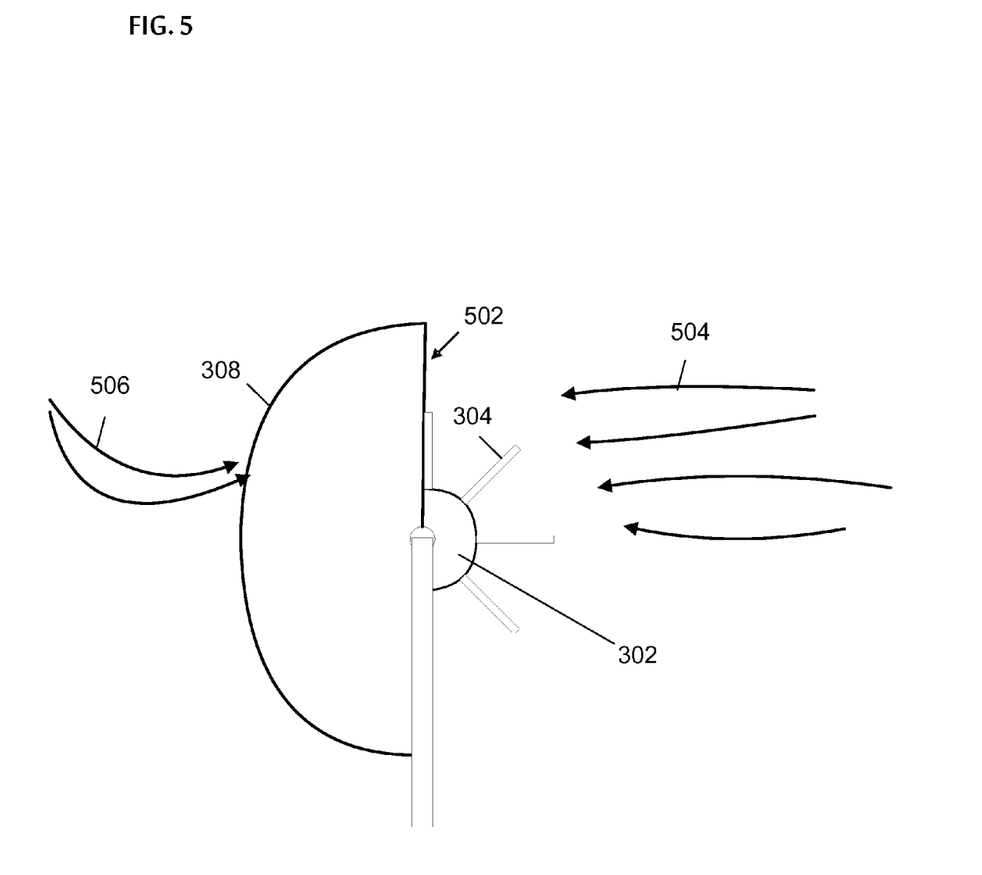

In one embodiment, wind turbine 100 also includes a shroud 308 for redirecting and/or concentrating wind flow either away from blades 304 or toward a portion of blades 304 such that the force from an induced wind flow passing over rotor 302 imparts maximum force to the blades 304. For example, as shown in FIGS. 4 and 5, shroud 308 is adjustable/rotatable. As shown in FIG. 4, shroud 308 may be rotated about an axis of rotor 302 such that an opening 402 of shroud 308 enables wind 404 induced by an aircraft landing to flow across blades 304 while shroud 308 also redirects/blocks unwanted wind 406 away from blades 304. Further, as shown in FIG. 5, shroud 308 may be rotated about an axis of rotor 302 such that an opening 502 of shroud 308 enables wind 504 induced by an aircraft at takeoff to flow across blades 304 while shroud 308 also redirects/blocks unwanted wind 506 away from blades 304. The position of shroud 308 may be manually or automatically adjustable (e.g., by wind turbine controller 216). In one embodiment, shroud 308 may be designed to orient itself based on a direction of the strongest wind.

A pitch angle (not shown) of rotor blades 304 (e.g., an angle that determines the perspective of rotor blades 304 with respect to the direction of wind), may also be changed by wind turbine controller 216. More specifically, increasing or decreasing a pitch angle of rotor blades 304 decreases or increases an amount of rotor blade surface area exposed to wind. In the exemplary embodiment, the pitch angles of rotor blades 304 are controlled individually. This enables further control of optimizing the capturing of wind induced by an aircraft.

Figure 6:
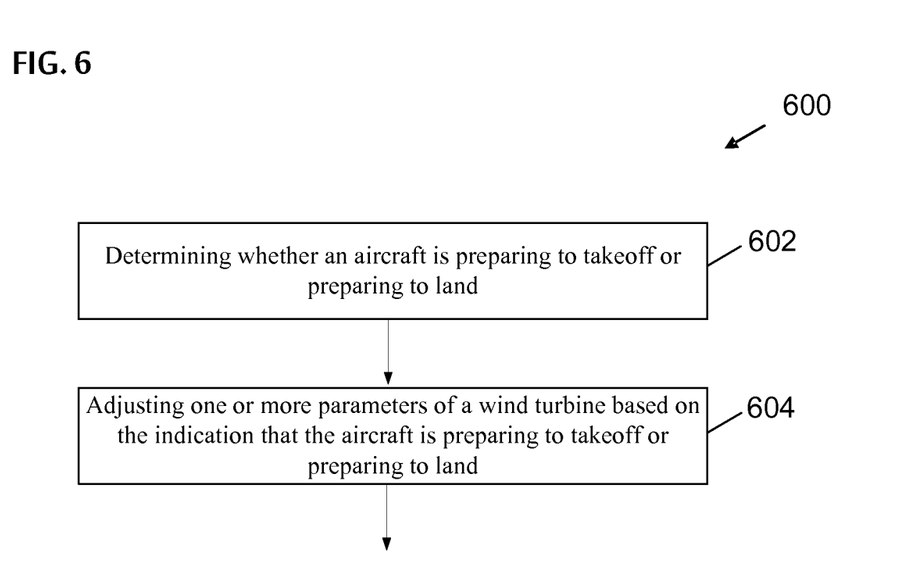
FIG. 6 is a flow diagram depicting a method of using a wind turbine to generate energy from wind induced by an aircraft.

With reference now to FIG. 6, a method 600 for generating energy from wind induced by an aircraft is provided. While method 600 is described herein as being performed by wind turbine controller 216, and more specifically, processor 218, any suitable controller and/or processor may be used. Method 600 begins 602 by determining whether an aircraft is landing or taking off. This information may be accessed from or received by computing device 202. That is, as mentioned above, computing device 202 stores flight schedule information, which can be transmitted to wind turbine controller 216 as needed, or periodically (e.g., daily, hourly, or when updates are available). Based on the determination in 602, at 604 one or more parameters of wind turbine 100 may be adjusted. In one embodiment, a parameter of wind turbine 100 may be a height of wind turbine 100, a direction wind turbine 100 faces, a pitch angle of blades 304, a position of shroud 308, and an optimum rotation speed of rotor 302. As such, components/parameters of wind turbine 100 may be adjusted such that capturing wind induced by an aircraft may be optimized regardless of a direction the aircraft is taking off from or landing from.

The examples used herein are illustrative only, and are not meant to be limited to the elements of those examples. The above-described embodiments provide an efficient and cost-effective system for generating energy from wind induced by an aircraft. The system, wind turbine, and method described herein are not limited to the specific embodiments described herein, but rather, components of the wind turbine and/or system and/or steps of the method may be utilized independently and separately from other components and/or steps described herein. For example, the system may also be used in combination with other systems and methods, and is not limited to practice with only the wind turbine and method as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for generating energy from wind induced by an aircraft, the system comprising:
   one or more wind turbines configured to generate electrical power by capturing wind induced by the aircraft, each of the one or more wind turbines comprising:
      a rotor mounted for rotation about an axis;
      a plurality of blades coupled to the rotor;
      one or more sensors configured to determine a direction of wind with respect to the wind turbine; and
      a controller in communication with said one or more sensors, said controller configured to:
         store schedule information for a plurality of aircraft;
         determine whether the aircraft is preparing to takeoff or land based on the schedule information;
         determine the direction of the wind based on said one or more sensors; and
         adjust one or more parameters of the one or more wind turbines based on the determination whether the aircraft is preparing to takeoff or preparing to land and on the determined direction of the wind, wherein the one or more parameters includes a direction in which the one or more wind turbines is facing.

2. The system of claim 1, wherein the controller is further configured to adjust a height of the one or more wind turbines.

3. The system of claim 1, wherein the controller is further configured to adjust an angle of each of the plurality of blades.

4. The system of claim 1, wherein the rotor is mounted for rotation about a horizontal axis, and wherein each of the plurality of blades extends along a length of the rotor.

5. The system of claim 1, wherein each of the one or more wind turbines further comprises a shroud configured to deflected unwanted wind and/or direct the wind induced by the aircraft such that additional force is imparted to the rotor.

6. The system of claim 5, wherein the controller is further configured to adjust a position of the shroud.

7. A wind turbine for generating energy from wind induced by an aircraft, the wind turbine comprising:
   a rotor mounted for rotation about an axis;
   a plurality of blades coupled to the rotor;
   a support structure coupled to the rotor;
   one or more sensors configured to determine a direction of wind with respect to the wind turbine; and
   a processor in communication with said one or more sensors, said processor programmed to:
      store schedule information for a plurality of aircraft;
      determine whether the aircraft is preparing to takeoff or land based on the schedule information;
      determining a direction of the wind based on said one or more sensors; and
      adjust one or more parameters of the wind turbine based on the in determination whether the aircraft is preparing to takeoff or preparing to land and on the determined direction of the wind, wherein the one or more parameters includes a direction in which the wind turbine is facing.

8. The wind turbine of claim 7, wherein the processor is further programmed to adjust a height of the wind turbine.

9. The wind turbine of claim 7, wherein the processor is further programmed to adjust an angle of each of the plurality of blades.

10. The wind turbine of claim 7, wherein the rotor is mounted for rotation about a horizontal axis, and wherein each of the plurality of blades extends along a length of the rotor.

11. The wind turbine of claim 10, further comprising a shroud, wherein the adjusting the one or more parameters of the wind turbine comprising adjusting a position of the shroud such that the shroud deflects unwanted wind away from the wind turbine.

12. The wind turbine of claim 10, further comprising a shroud, wherein the adjusting one or more parameters of the wind turbine comprising adjusting a position of the shroud to direct the wind induced by the aircraft such that additional force is imparted to the rotor.

13. The wind turbine of claim 7, wherein the processor is further programmed to set an optimal rotation speed of the rotor.

14. A method for using a wind turbine to generate energy from wind induced by an aircraft, the method comprising:
   storing schedule information for a plurality of aircraft;
   determining whether the aircraft is preparing to takeoff or preparing to land based on the schedule information;
   determining a direction of wind based on one or more sensors;

adjusting one or more parameters of the wind turbine based on the determination whether the aircraft is preparing to takeoff or preparing to land and on the determined direction of the wind, wherein the wind turbine comprises a rotor mounted for rotation about an axis, and a plurality of blades coupled to the rotor, wherein the one or more parameters includes a direction in which the wind turbine is facing.

15. The method of claim 14, wherein adjusting the one or more parameters of the wind turbine comprises adjusting a height of the wind turbine.

16. The method of claim 14, wherein adjusting the one or more parameters of the wind turbine comprises adjusting an angle of the plurality of blades.

17. The method of claim 14, wherein adjusting the one or more parameters of the wind turbine comprises adjusting a position of a shroud to deflect unwanted wind away from the wind turbine.

18. The method of claim 14, wherein adjusting the one or more parameters of the wind turbine comprises adjusting a position of a shroud to direct the wind induced by the aircraft to increase the force of wind into the rotor.

19. The method of claim 14, wherein adjusting one or more parameters of the wind turbine comprises setting an optimum rotation speed of the rotor.

\* \* \* \* \*

UNITED STATES PATENT AND TRADEMARK OFFICE
CERTIFICATE OF CORRECTION

| | | |
|---|---|---|
| PATENT NO. | : 9,732,732 B2 | Page 1 of 1 |
| APPLICATION NO. | : 13/784373 | |
| DATED | : August 15, 2017 | |
| INVENTOR(S) | : Brett Mukherjee Hoffstadt | |

It is certified that error appears in the above-identified patent and that said Letters Patent is hereby corrected as shown below:

In the Claims

In Claim 1, Column 5, Line 49, delete "an aircraft" and insert therefor -- the aircraft --.

In Claim 5, Column 6, Line 15, delete "deflected" and insert therefor -- deflect --.

In Claim 7, Column 6, Line 34, delete "on the in" and insert therefor -- on the --.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*